(12) United States Patent
Wu

(10) Patent No.: US 11,110,509 B2
(45) Date of Patent: Sep. 7, 2021

(54) FLEXIBLE FRICTION DRIVING DEVICE

(71) Applicants: Shanghai Anzi Industrial Co., Ltd., Shanghai (CN); Shanghai Well-Done Machinery Manufacturing Co., Ltd., Shanghai (CN)

(72) Inventor: Mingxiang Wu, Shanghai (CN)

(73) Assignees: SHANGHAI ANZI INDUSTRIAL CO., LTD., Shanghai (CN); SHANGHAI WELL-DONE MACHINERY MANUFACTURING CO., LTD., Shanghai (CN)

( * ) Notice: Subject to any disclaimer, the term of this patent is extended or adjusted under 35 U.S.C. 154(b) by 174 days.

(21) Appl. No.: 16/585,151

(22) Filed: Sep. 27, 2019

(65) Prior Publication Data

US 2020/0101520 A1  Apr. 2, 2020

(30) Foreign Application Priority Data

Sep. 30, 2018  (CN) .......................... 201811163200.3

(51) Int. Cl.
| B21J 15/26 | (2006.01) |
| F16H 55/32 | (2006.01) |
| F16H 1/06 | (2006.01) |
| F16H 13/00 | (2006.01) |

(52) U.S. Cl.
CPC .............. *B21J 15/26* (2013.01); *F16H 55/32* (2013.01)

(58) Field of Classification Search
CPC .......... B21J 15/26; F16H 55/32; F16H 13/00; F16H 1/06
See application file for complete search history.

(56) References Cited

U.S. PATENT DOCUMENTS

| 6,141,849 A | * | 11/2000 | Honsel | ..................... B21J 15/26 |
| | | | | 29/243.521 |
| 6,912,763 B2 | * | 7/2005 | Kovar | ..................... B21J 15/043 |
| | | | | 29/243.527 |
| 10,112,232 B2 | * | 10/2018 | Honsel | ..................... B21J 15/26 |
| 2016/0114383 A1 | * | 4/2016 | Honsel | ..................... B21J 15/26 |
| | | | | 29/525.07 |

FOREIGN PATENT DOCUMENTS

| CN | 2483152 Y | * | 3/2002 | |
| CN | 205401511 | * | 7/2016 | |
| WO | WO-2009044932 A1 | * | 4/2009 | ............ B25B 21/00 |

* cited by examiner

*Primary Examiner* — Bayan Salone
(74) *Attorney, Agent, or Firm* — Ware, Fressola, Maguire & Barber LLP

(57) ABSTRACT

A flexible friction driving device has a driving gear, a driven gear, a hexagonal sleeve, a damping ring, an elastic ring and two bearing seats, wherein the driving gear is mounted below the driven gear and engaged with the driven gear; the hexagonal sleeve is disposed between the two bearing seats, and the damping ring and the driven gear are successively sheathed on the hexagonal sleeve; a cap and the elastic ring are placed in an opening at one end of the driven gear; the elastic ring compresses the damping ring onto a cylindrical outer surface of the hexagonal sleeve; power from a motor is transferred to the driven gear by the driving gear; and, the power is flexibly transferred to the hexagonal sleeve by the friction of the inner holes of the damping ring and the driven gear against the cylindrical outer surface of the hexagonal sleeve.

5 Claims, 1 Drawing Sheet

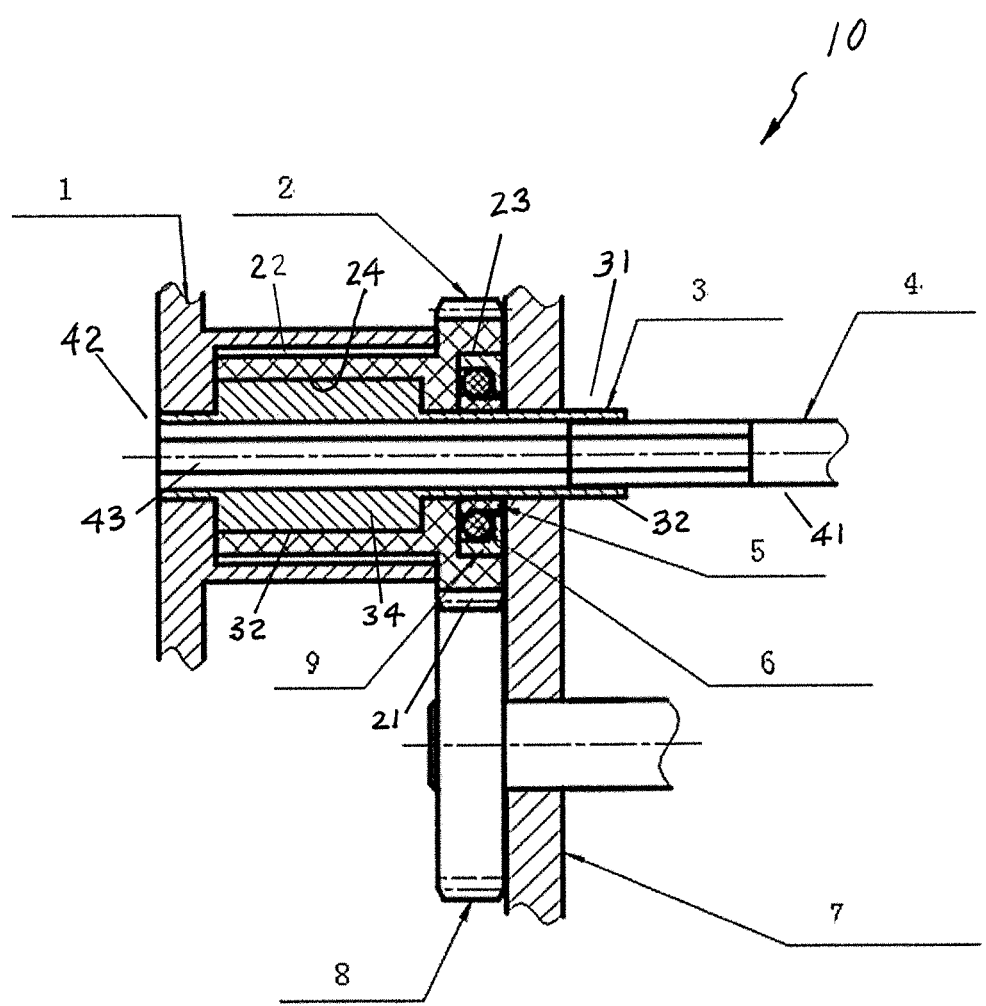

FLEXIBLE FRICTION DRIVING DEVICE

CROSS REFERENCE TO RELATED PATENT APPLICATION

This application claims benefit to Chinese Patent Application No. 201811163200.3, filed Sep. 30, 2018, which is hereby incorporated by reference in its entirety.

TECHNICAL FIELD OF THE INVENTION

The present invention relates to an electrically driven quick riveting tool and, in particular, to a flexible friction driving device and an electrically driven nut riveting tool including the same.

BACKGROUND OF THE INVENTION

For an electrically driven nut riveting tool, the power for pulling a rivet nut and the power for fastening a rivet nut are usually provided by a same motor through a clutch. However, the existing clutches are complex in structure, tedious in adjustment, poor in reliability and easy to damage. Those defects need to be improved.

SUMMARY OF THE INVENTION

A technical problem to be solved by the present invention is to provide a flexible friction driving device and an electrically driven nut riveting tool including the same, which are simple in structure and free of adjustment.

To solve the above technical problem, the present invention provides a flexible friction driving device, including a driving gear, a driven gear, a sleeve, a damping ring, an elastic ring and two bearing seats, wherein the driving gear is mounted below the driven gear and engaged with the driven gear; the sleeve is disposed between the two bearing seats, and the damping ring and the driven gear are successively sheathed on the sleeve; a cap and the elastic ring are placed in a circular opening at one end of the driven gear; the elastic ring is arranged to compress the damping ring onto a cylindrical outer surface of the sleeve. As such, power from a motor is transferred to the driven gear by the driving gear; and, the power is flexibly transferred to the sleeve by the friction of the inner hole of the damping ring and the driven gear against the cylindrical outer surface of the sleeve.

An inner tube is formed on the sleeve, and torque is transferred by the inner tube together with an outer hexagon surface at one end of a connecting rod to a rivet nut driven tool.

The present invention further provides an electrically driven nut riveting tool including the flexible friction driving device.

Thus, it is an aspect of the present invention to provide a frictional driving device, comprising:
 a first bearing seat;
 a second bearing seat spaced from the first bearing seat, leaving a gap therebetween;
 a sleeve having a first sleeve section and a second sleeve section, the first sleeve section having a cylindrical outer surface, the second sleeving section having a hexagonal sleeve surface;
 a driven gear located in the gap between the first bearing seat and the second bearing seat, the driven gear having a first gear end and a second gear end, the first gear end having a circular opening, the second gear end having an inner hexagonal opening dimensioned to receive the hexagonal sleeve surface of the sleeve;
 a damping ring located in the circular opening of the driven gear, dimensioned to receive part of the cylindrical outer surface of the sleeve;
 an elastic ring located in the circular opening of the driven gear, dimensioned to receive the damping ring;
 a cap located in the circular opening of the driven gear, configured for pressing the elastic ring against the circular opening of the driven gear; and
 a driving gear positioned in relationship with and engaged with the driven gear.

According to an embodiment of the present invention, circular opening of the driven gear is located adjacent to the first bearing seat, and the driving gear is also located adjacent to the first bearing seat.

The second aspect of the present invention is an electrically driven nut riveting tool, comprising
 a first bearing seat;
 a second bearing seat spaced from the first bearing seat, leaving a gap therebetween;
 a sleeve having a first sleeve section and a second sleeve section, the first sleeve section having a cylindrical outer surface, the second sleeving section having a hexagonal sleeve surface;
 a driven gear located in the gap between the first bearing seat and the second bearing seat, the driven gear having a first gear end and a second gear end, the first gear end having a circular opening, the second gear end having an inner hexagonal opening dimensioned to receive the hexagonal sleeve surface of the sleeve;
 a damping ring located in the circular opening of the driven gear, dimensioned to receive part of the cylindrical outer surface of the sleeve;
 an elastic ring located in the circular opening of the driven gear, dimensioned to receive the damping ring;
 a cap located in the circular opening of the driven gear, configured for pressing the elastic ring against the circular opening of the driven gear;
 a driving gear positioned in relationship with and engaged with the driven gear; and
 a connecting rod having a first rod end and a second rod end, the first rod end arranged to engage with a riveting nut, the second rod end having a hexagonal outer surface, wherein the sleeve further comprising an inner tube dimensioned to receive the second rod end of the connecting rod.

According to an embodiment of the present invention, the circular opening of the driven gear is located adjacent to the first bearing seat, and the driving gear is also located adjacent to the first bearing seat, and wherein the second end of the connecting rod is located adjacent to the first bearing seat, outside the gap between the first bearing seat and the second bearing seat.

The present invention has the following advantages.

1) In the present invention, the torque is flexible during the screwing-in of a rivet nut, and no harm will be caused to tool operators.

2) Since the clutch having a complex structure is omitted, so the present invention is simple and reliable in structure, free of adjustment and suitable for various electrically driven nut riveting tools, and thus has a promising application prospect.

BRIEF DESCRIPTION OF THE DRAWING

The accompanying drawing illustrates an embodiment of the present invention.

FIG. 1 is a schematic structure diagram of a flexible friction driving device according to the present invention, in which:

1: first bearing seat;
2: driven gear
21: first gear end
22: second gear end
23: circular opening
24: inner hexagonal opening;
3: hexagonal sleeve
31: first sleeve section
32: second sleeve section
33: cylindrical outer surface
34: hexagonal sleeve surface;
4: connecting rod
41: first rod end
42: second rod end
43: hexagonal outer surface;
5: damping ring;
6: O-shaped elastic or rubber ring;
7: second bearing seat;
8: driving gear;
9: cap, and
10: electrically driven nut riveting tool.

DETAILED DESCRIPTION OF THE INVENTION

As shown in FIG. 1, the present invention provides a flexible or soft frictional driving device, which includes a driving gear 8, a driven gear 2, a sleeve 3, a damping ring 5, an O-shaped elastic or rubber ring 6, a first bearing seat 1 and a second bearing seat 7. The driving gear 8 is mounted below or in relationship to the driven gear 2 and engaged with the driven gear 2. The sleeve 3 is disposed between the first bearing seat 1 and the second bearing seat 7. The sleeve 3 comprises a first sleeve section 31 having a cylindrical outer surface 33, and a second sleeve section 32 having a hexagonal sleeve surface 34. The damping ring 5 and the driven gear 2 are successively sheathed on the sleeve 3. The driven gear 2 is also located between the first bearing seat 1 and the second bearing seat 2. The driven gear 2 comprises a first gear end 21 and a second gear end 22, the first gear end 21 having a circular opening 22 for placing therein the damping ring 5 and the O-shaped rubber ring 6. The second gear end 22 of the driven gear 2 has an inner hexagonal opening 24 dimensioned to receive the hexagonal sleeve surface 34 of the sleeve 3.

A cap 9 is placed in the circular opening 23 of the second gear end 22 of the driven gear 2, over the O-shaped rubber ring 6 such that the O-shaped rubber ring 6 compresses the damping ring 5 onto the cylindrical outer surface 33 of the sleeve 3. The driven gear 8 is arranged to engage with a motor (not shown) for rotation. When power from the motor is transferred to the driven gear 2 by the driving gear 8, the power is then softly or flexibly transferred to the sleeve 3 by the friction of the inner surface of the damping ring 5 and by the force asserted to the hexagonal sleeve surface 34 on the second sleeve section 32. As such, the sleeve 3 is driven to rotate with the driven gear 2.

In an embodiment of the present invention, the sleeve 3 has an inner tube dimensioned to receive a connection rod 4. The connection rod 4 comprises a first rod end 41 and a second rod end 42 having a hexagonal outer surface. The first rod end 41 is configured for connection to a nut riveting tool (not shown).

The present invention also provides an electrically driven nut riveting tool including the flexible friction driving device. The nut riveting tool includes a driving gear 8, a driven gear 2, a sleeve 3, a connecting rod 4, a damping ring 5, an O-shaped elastic or rubber ring 6, a first bearing seat 1 and a second bearing seat 7. The driving gear 8 is mounted below or in relationship to the driven gear 2 and engaged with the driven gear 2. The sleeve 3 is disposed between the first bearing seat 1 and the second bearing seat 7. The sleeve 3 comprises a first sleeve section 31 having a cylindrical outer surface 33, and a second sleeve section 32 having a hexagonal sleeve surface 34. The damping ring 5 and the driven gear 2 are successively sheathed on the sleeve 3. The driven gear 2 is also located between the first bearing seat 1 and the second bearing seat 2. The driven gear 2 comprises a first gear end 21 and a second gear end 22, the first gear end 21 having a circular opening 22 for placing therein the damping ring 5 and the O-shaped rubber ring 6. The second gear end 22 of the driven gear 2 has an inner hexagonal opening 24 dimensioned to receive the hexagonal sleeve surface 34 of the sleeve 3. The connection rod 4 comprises a first rod end 41 and a second rod end 42 having a hexagonal outer surface. The sleeve 3 has an inner tube dimensioned to receive the second rod end 42 of the connection rod 4. The first rod end 41 is arranged for pulling or fastening a riveting nut. A cap 9 is placed in the circular opening 23 of the second gear end 22 of the driven gear 2, over the O-shaped rubber ring 6.

When the reverse moment externally applied to the connecting rod 4 is greater than the friction moment applied to the cylindrical outer surface 33 of the sleeve 3 by the damping ring 5 and the driven gear 2, both the damping ring 5 and the driven gear 2 may slip relative to the sleeve 3. As such the sleeve 3 stops rotating with the driven gear 2 to avoid generating a large load on the motor.

When the moment generated as an operator holds the electrically-driven rivet nut is greater than the friction moment applied to the cylindrical outer surface 33 of the sleeve 3 by the damping ring 5 and the driven gear 2, the hexagonal sleeve 3 stops rotating with the driven gear 2 to avoid harming the operator.

The foregoing description merely shows preferred embodiments of the present invention and is not intended to limit the present invention. Various modifications and variations can be made to the present invention by a person of ordinary skill in the art. Any modifications, equivalent replacements and improvements made without departing from the spirit and principle of the present invention shall fall into the protection scope of the present invention.

What is claimed is:

1. A frictional driving device, comprising: a first bearing seat; a second bearing seat spaced from the first bearing seat, leaving a gap therebetween; a sleeve having a first sleeve section and a second sleeve section, the first sleeve section having a cylindrical outer surface, the second sleeve section having a hexagonal sleeve surface; a driven gear located in the gap between the first bearing seat and the second bearing seat, the driven gear having a first gear end and a second gear end, the first gear end having circular opening, the second gear end having an inner hexagonal opening dimensioned to receive the hexagonal sleeve surface of the sleeve; a damping ring located in the circular opening of the driven gear, dimensioned to receive part of the cylindrical outer surface of the sleeve; an elastic ring located in the circular opening of the driven gear, dimensioned to receive the damping ring; a cap located in the circular opening of the driven gear, configured for pressing the elastic ring against the circular opening of the driven gear; and a driving gear positioned in relationship with and engaged with the driven gear.

2. The frictional driving device according to claim 1, wherein the circular opening of the driven gear is located adjacent to the first bearing seat, and the driving gear is also located adjacent to the first bearing seat.

3. The frictional driving device according to claim 1, wherein the elastic ring is an O-shaped rubber ring.

4. An electrically driven nut riveting tool, comprising the frictional driving device according to claim 1, the nut riveting tool further comprising:
   a connecting rod having a first rod end and a second rod end, the first rod end arranged to engage with a riveting nut, the second rod end having a hexagonal outer surface, wherein the sleeve further comprising an inner tube dimensioned to receive the second rod end of the connecting rod.

5. The electrically driven nut riveting tool according to claim 4, wherein the circular opening of the driven gear is located adjacent to the first bearing seat, and the driving gear is also located adjacent to the first bearing seat, and wherein the second end of the connecting rod is located adjacent to the first bearing seat, outside the gap between the first bearing seat and the second bearing seat.

* * * * *